United States Patent [19]

Elijah

[11] 4,298,106

[45] Nov. 3, 1981

[54] METHOD AND APPARATUS FOR BRAKING TORQUE AMPLIFIER

[76] Inventor: Jerry D. Elijah, 209-8th Street, Tipton, Iowa 52772

[21] Appl. No.: 14,046

[22] Filed: Feb. 22, 1979

[51] Int. Cl.³ ............................................. B60K 41/22
[52] U.S. Cl. .................................. 192/3.57; 192/87.1; 91/526; 91/531
[58] Field of Search ................. 192/3.57, 87.13, 87.16, 192/87.17, 87.18, 87.1; 180/53 B

[56] References Cited

U.S. PATENT DOCUMENTS

| | | | |
|---|---|---|---|
| 2,929,478 | 3/1960 | Tuck et al. | 192/87.13 X |
| 3,163,270 | 12/1964 | Zingsheim | 192/3.57 X |
| 3,651,904 | 3/1972 | Snoy et al. | 192/87.13 X |

OTHER PUBLICATIONS

Blue Ribbon Service Manual GSS-1343, Jun. 1963, International Harvester Co., Chicago, Ill., 35 p.

Primary Examiner—Robert Mackey
Attorney, Agent, or Firm—Zarley, McKee, Thomte, Voorhees & Sease

[57] ABSTRACT

The apparatus of the present invention comprises a torque amplifier assembly having a first shaft and a second shaft, each with complementary direct drive gears and complementary torque amplifier gears thereon. The torque amplifier and direct drive gears are rotatable on the first shaft, but may be independently coupled to the first shaft by means of a torque amplifier clutch or a direct drive clutch. In order to stop the rotation of the torque amplifier and direct drive gears, the clutches for both the direct drive gear and the torque amplifier gear are simultaneously actuated to cause them both to be engaged to the first shaft. The resulting difference in gear ratios causes the two shafts to stop rotating.

2 Claims, 4 Drawing Figures

METHOD AND APPARATUS FOR BRAKING TORQUE AMPLIFIER

BACKGROUND OF THE INVENTION

This invention relates to a method and apparatus for braking the rotating gears within a torque amplifier.

Many present farm tractors include a torque amplifier assembly which is located between the main engine clutch and the transmission of the tractor. The torque amplifier permits the operator to engage a torque amplifier gear when a desired increase in torque is required. The increase in torque can be accomplished with the torque amplifier without disengaging the clutch or shifting the gears in the transmission.

The torque amplifier assembly includes a first shaft which is coupled to the engine output shaft by means of the clutch. The first shaft includes a torque amplifier gear and a direct drive gear thereon. These gears interlock with complementary gears on a second shaft which in turn is drivingly connected to the transmission of the vehicle.

In normal operation of the torque amplifier, only one of the direct drive or torque amplifier gears is engaged at any given time. The hydraulic circuitry on present devices does not permit simultaneous engagement of the direct drive gear and the torque amplifier gear.

A problem is encountered with the present torque amplifier assemblies whenever the operator leaves the engine running with the clutch engaged and with the transmission in neutral. This would be the typical condition should the operator decide to dismount from the vehicle while leaving the engine running.

When the operator again mounts the vehicle and prepares to move forward again with the vehicle, he depresses the clutch and tries to shift the transmission into a driving gear. However, when he depresses the clutch, the amplifier gear and the direct drive gear continue rotating in a free wheeling action by virtue of their inertia. This prevents the operator from engaging the gears of the transmission without grinding the gears. Accordingly, the operator must wait for the rotation of the torque amplifier to stop before he can shift gears.

Present devices have placed mechanical brakes in mechanical engagement with the torque amplifier gear or direct drive gear to permit the operator to stop the rotation so that the gears in the transmission may be shifted. These present devices are cumbersome, usually require adjustment, and are inefficient.

SUMMARY OF THE INVENTION

The present invention contemplates a control mechanism for causing simultaneous engagement of both the torque amplifier gear and the direct drive gear. The simultaneous engagement causes the gears of different ratios to work against one another to stop the rotation of the gears within the torque amplifier assembly.

The control mechanism of the present invention is actuated by the depression of the clutch foot pedal to its extreme lowest position. In this lowest position the foot pedal opens a valve which introduces pressure to the clutches for both the torque amplifier and the direct drive gears. Consequently depression of the clutch foot pedal to its extreme lowest position causes actuation of both the direct drive clutch and the torque amplifier clutch, and results in a braking action on the rotating gears within the torque amplifier assembly.

Therefore, a primary object of the present invention is the provision of an improved method and apparatus for braking the rotating gears within a torque amplifier.

A further object of the present invention is the provision of a method and apparatus which can be easily adapted to present equipment with a minimum of effort and materials.

A further object of the present invention is the provision of a method and apparatus for braking the torque amplifier assembly which operates only when the engine clutch is disengaged.

A further object of the present invention is the provision of an improved apparatus and method which are simple and which do not complicate the controls which the operator of the vehicle must manipulate.

A further object of the present invention is the provision of a method and apparatus which permits a smooth braking action on the rotating torque amplifier assembly so as to minimize the damage and wear on the parts within the torque amplifier.

A further object of the present invention is the provision of a method and apparatus which are economical, durable and efficient in operation.

DETAILED DESCRIPTION OF THE INVENTION

Figure 1:
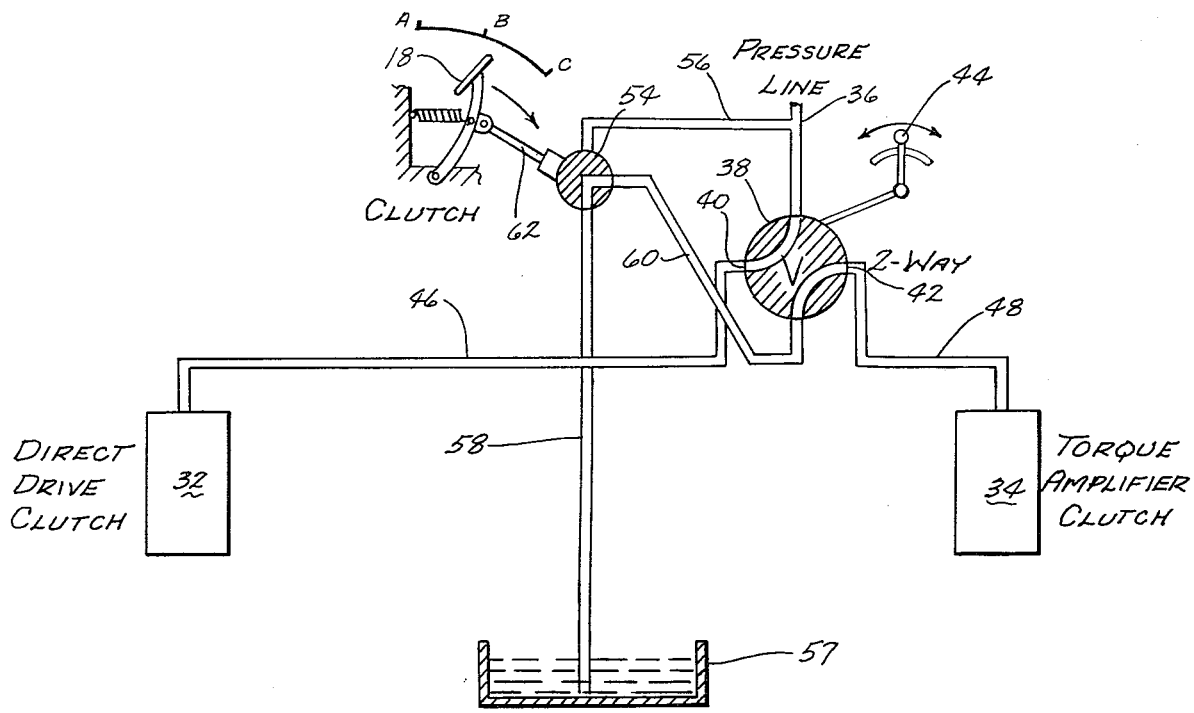
FIG. 1 is a schematic diagram of the hydraulic circuitry for the control mechanism of the present device.

Referring to the drawings, the drive train of a conventional tractor having a torque amplifier thereon is shown. The drive train includes a vehicle engine 10 having an output shaft 12 extending therefrom. A main engine clutch 14 provides means for coupling and uncoupling driving connection from output shaft 12 to a drive shaft 16. Clutch 14 is operated by a conventional clutch foot pedal 18 (FIG. 1). The linkage interconnecting foot pedal 18 and clutch 14 are well known in the art and therefore are not shown in the drawings. However, depression of clutch foot pedal 18 causes it to move from the position marked "A" to the position marked "B" to the position marked "C" shown in FIG. 1. At position A clutch 14 is engaged. At position B, clutch 14 becomes disengaged, and at position C the braking device of the present invention is actuated as will be explained more fully hereinafter.

Figure 4:
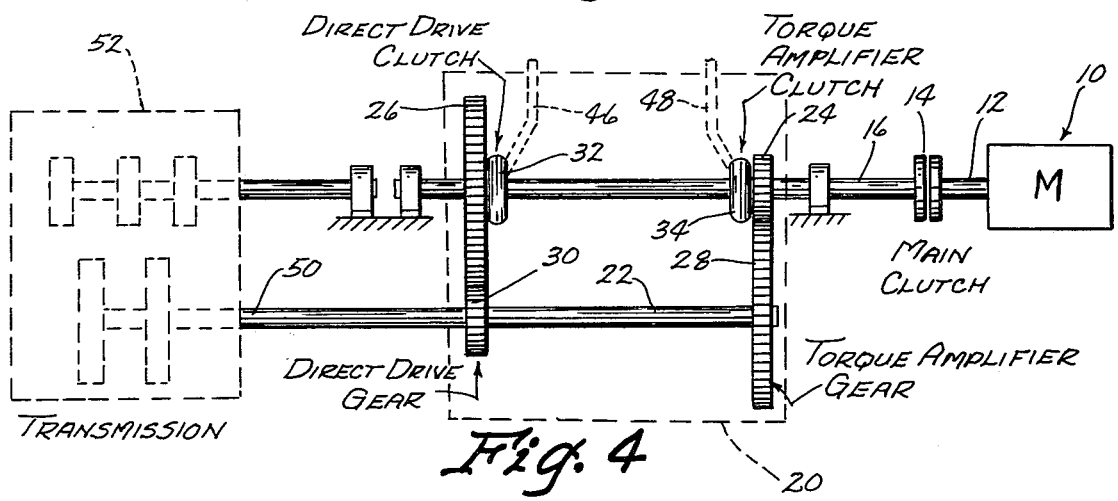
FIG. 4 is a schematic diagram of the torque amplifier in combination with the vehicle engine and the transmission.

The numeral 20 refers to the torque amplifier assembly shown in FIG. 4. Rotatably mounted within the assembly 20 are drive shaft 16 and a transmission shaft 22. Rotatably mounted on drive shaft 16 are a torque amplifier gear 24 and a direct drive gear 26, each of which is intermeshed with a complementary torque amplifier and direct drive gear 28, 30 on shaft 22. The gear ratios of direct drive gears 26, 30 are different than the gear ratios of torque amplifier gears 24, 28. Complementary gears 28, 30 are fixed to shaft 22 whereas gears 24, 26 are normally free to rotate with respect to shaft 16. A direct drive clutch 32 is associated with direct drive gear 26 and is adapted upon actuation to couple direct drive gear 26 to shaft 16 for rotation in unison therewith. Similarly, a torque amplifier clutch 34 is associated with torque amplifier gear 24 and is adapted upon actuation to couple gear 24 to shaft 16 for rotation in unison therewith. Clutches 32, 34 are hydraulically operated, and the means for controlling these clutches is shown in FIG. 1.

Referring to FIG. 1, a hydraulic pressure line 36 leads to a two-way valve 38 having two outlets 40, 42. Valve 38 will permit fluid to flow outwardly through either outlet 40 or outlet 42, but will not permit fluid to be introduced to both of these outlets at the same time. Valve 38 is controlled by manual control 44 operated by the operator of the vehicle. Leading from outlet 40, 42 are a direct drive hydraulic line 46, and a torque amplifier hydraulic line 48. Line 46 leads to direct drive clutch 32 and is adapted to actuate direct drive clutch 32 in response to the receipt of pressurized fluid from valve 38. Actuation of clutch 32 causes direct drive gear 26 to be coupled to shaft 16, thereby permitting the line of drive from the engine 10 through clutch 14 to shaft 16 and through gears 26, 30 to shaft 22. Shaft 22 includes a rearward end 50 which extends into the transmission and provides a driving force for the transmission 52.

Also included in the control mechanism for clutches 32, 34 is a braking valve 54. Valve 54 receives pressurized fluid from conduit 56 and is connected to a reservoir 57 by means of a line 58. Vlave 54 is also connected to valve 38 by line 60.

Figures 2, 3:
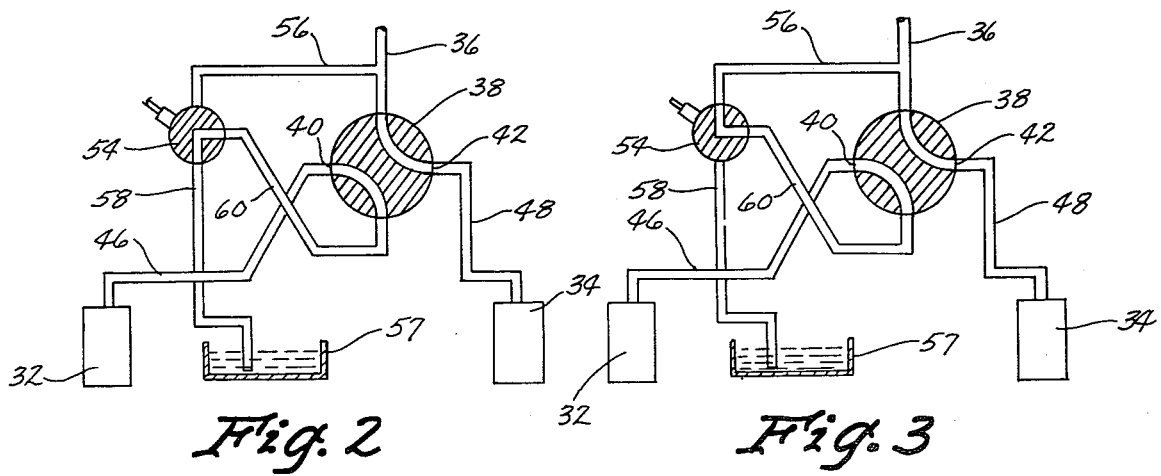
FIGS. 2 and 3 are schematic diagrams similar to that of FIG. 1, but showing the valves in different positions.

The normal positions for the valves are shown in FIGS. 1 and 2. In one of these positions (FIG. 1), valve 38 provides communication from pressure line 36 to line 46, thereby actuating direct drive clutch 32. Valve 38 also provides communication from torque amplifier clutch 34 to line 60 which is in communication with valve 54. Valve 54 is in a position which permits fluid from line 60 to return to the reservoir via line 58. In this position, valve 54 is also closed to pressurized fluid which it receives from conduit 56. Thus fluid pressure from torque amplifier clutch 34 is relieved to the reservoir 57 via line 48, valve 38, line 60, valve 54, and line 58. This permits torque amplifier clutch 34 to remain in a disengaged condition.

When the operator wishes to increase the torque supplied to the transmission, he moves lever 44 to cause valve 38 to move from the position in FIG. 1 to the position in FIG. 2. This causes introduction of pressurized fluid to torque amplifier clutch 34 and simultaneously provides relief of hydraulic pressure from direct drive clutch 32 through valve 38 and valve 54 to reservoir 57. This relief of pressure permits direct drive clutch 32 to move to a disengaged condition.

When the operator depresses clutch pedal 18 to its extreme lower position indicated by C in FIG. 1, a linkage 62 interconnecting valve 54 and clutch pedal 18 causes valve 54 to move to its position shown in FIG. 3. In this position, valve 54 introduces pressurized fluid from conduit 56 to direct drive clutch 32 via line 60, valve 38, and line 46. Simultaneously, valve 54 cuts off reservoir 57 and line 58 from both clutches 32, 34. The result is actuation of both clutches 32, 34. Engagement of both of these clutches causes a braking action on shafts 16 and 22 by virtue of the differing gear ratios of direct drive gears 26, 30 and torque amplifier gears 24, 28. The hydraulic operation of the clutches permits a smooth, but forceful braking action on these rotating components.

Valve 38 is shown in FIG. 3 in a position for introducing pressure to clutch 34. However, if valve 38 is in the position shown in FIG. 1, and valve 54 is in the position of FIG. 3, the clutches 32, 34 are still pressurized, with pressure from valve 54 going to clutch 34 and pressure from valve 38 going to clutch 32.

The present invention permits the actuation of both the direct drive clutch and the torque amplifier clutch only when the main engine clutch is disengaged. This is because the valve 54 is not moved to its open position until clutch foot pedal 18 has disengaged clutch 14 and moved to its extreme lower position represented by C in FIG. 1. Thus, the present invention does not permit engagement of both the torque amplifier and the direct drive clutches when clutch 14 is engaged, for to do so would cause serious damage to the parts of the drive train.

The present invention can be easily incorporated into present devices merely by the insertion of the valve 54, conduits 56, 58, 60 and linkage 62. This is a relatively simple operation and does not require extensive modification of the present devices.

The device is economical, durable and efficient, and thus it can be seen that the device accomplishes at least all of its stated objectives.

What is claimed is:

1. A braking device for a torque amplifier comprising: an engine;
   a first drive shaft;
   an engine clutch for alternatively connecting and disconnecting said engine to said first drive shaft;
   a direct drive gear rotatably mounted on said first drive shaft;
   a direct drive clutch associated with said direct drive gear for selectively coupling and uncoupling said direct drive gear to said first drive shaft;
   a torque amplifier gear rotatably mounted on said first drive shaft;
   a torque amplifier clutch associated with said torque amplifier gear for selectively coupling and uncoupling said torque amplifier gear to said first drive shaft;
   a first transmission shaft having a driven direct drive gear and a driven torque amplifier gear fixed thereto in meshing engagement with said direct and torque amplifier gears, respectively,
   torque amplifier control means connected to said torque amplifier clutch and said direct drive clutch for controlling the coupling and uncoupling thereof to said first drive shaft;
   said torque amplifier control means comprising a torque amplifier valve connected to a source of hydraulic pressure, first and second conduits connecting said torque amplifier valve to said torque amplifier clutch and said direct drive clutch respectively, a brake control valve, a third conduit interconnecting said torque amplifier valve and said brake control valve and a fourth conduit interconnecting said brake control valve and said source of hydraulic pressure;
   said torque amplifier valve being movable to a first position connecting one of said first and second conduits to said source of hydraulic pressure and the other of said first and second conduits to said brake control valve, through said third conduit;
   said torque amplifier valve being further movable to a second position connecting said other of said first and second conduits to said source of hydraulic pressure and said one of said first and second conduits to said brake control valve through said third conduit, and said brake control valve being movable from a closed position closing off said source of hydraulic pressure from said fourth conduit to said third conduit to an open position connecting said source of hydraulic pressure from said fourth conduit to said third conduit only when said engine clutch has disengaged said engine from said direct drive shaft; whereby said torque amplifier clutch and said direct drive clutches are both actuated when said brake control valve is in said open position, thereby causing said direct drive gear and said torque amplifier gears both to be fixed to said first drive shaft, the resulting difference in gear ratios of said direct drive and torque amplifier gears causing said direct drive and said transmission shafts to stop rotating.

2. An improved braking device for a torque amplifier comprising a drive shaft and a transmission shaft, a direct drive gear and a torque amplifier gear rotatably mounted on said drive shaft, a driven direct drive gear and a driven torque amplifier gear fixed to said transmission shaft and intermeshing with said direct drive and torque amplifier gears, respectively; a direct drive clutch associated with said direct drive gear and a torque amplifier clutch associated with said torque amplifier gear for selectively coupling and uncoupling said direct drive gear and said torque amplifier gear, respectively, to said drive shaft; control means for selectively actuating said direct drive and torque amplifier clutches one at a time to couple said direct drive gear and said torque amplifier gear, respectively, to said transmission shaft one at a time; said control means comprising hydraulic circuitry connected to said direct drive and torque amplifier clutches and a first valve movable from a first position directing pressurized hydraulic fluid to only said direct drive clutch to a second position directing hydraulic fluid only to said torque amplifier clutch; said improved braking device comprising:

a brake control valve connected to said source of hydraulic pressure;

hydraulic connecting means interconnecting said brake control valve and said first valve;

said first valve interconnecting said connecting means to said torque amplifier clutch when said first valve is in said first position and connecting said connecting means to said direct drive clutch when said first valve is in said second position;

said brake control valve being selectively movable from a first position connecting said pressure source to said connecting means to a second position disconnecting said pressure source from said connecting means whereby both of said torque amplifier and direct drive clutches will be actuated whenever said brake control valve is in said first position, independently of whether said first valve is in its said first or second positions.

* * * * *